United States Patent
Kimoto et al.

(10) Patent No.: US 11,536,702 B2
(45) Date of Patent: Dec. 27, 2022

(54) AUTOMATIC SAMPLE INJECTION DEVICE

(71) Applicant: SHIMADZU CORPORATION, Kyoto (JP)

(72) Inventors: Yasuhiro Kimoto, Kyoto (JP); Ayaka Kisaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/476,669

(22) Filed: Sep. 16, 2021

(65) Prior Publication Data

US 2022/0146466 A1 May 12, 2022

(30) Foreign Application Priority Data

Nov. 10, 2020 (JP) .............................. JP2020-187059

(51) Int. Cl.
*G06F 3/00* (2006.01)
*G01N 30/16* (2006.01)
*G06F 3/14* (2006.01)
*G06F 3/01* (2006.01)
*G01N 30/02* (2006.01)

(52) U.S. Cl.
CPC ............. *G01N 30/16* (2013.01); *G06F 3/14* (2013.01); *G01N 2030/027* (2013.01)

(58) Field of Classification Search
None
See application file for complete search history.

(56) References Cited

U.S. PATENT DOCUMENTS

| | | | |
|---|---|---|---|
| 2007/0157709 A1* | 7/2007 | Gamble | G01N 35/10 73/864.86 |
| 2013/0124105 A1* | 5/2013 | Rogel | G01N 33/2823 702/25 |
| 2016/0329203 A1* | 11/2016 | Fujita | H01J 49/107 |
| 2018/0299414 A1* | 10/2018 | Jung | G01N 30/16 |
| 2019/0234983 A1* | 8/2019 | Hanafusa | G01N 35/1002 |

(Continued)

FOREIGN PATENT DOCUMENTS

JP 2020-134194 A 8/2020

*Primary Examiner* — Toan H Vu
(74) *Attorney, Agent, or Firm* — Sughrue Mion, PLLC

(57) ABSTRACT

An automatic sample injection device includes: an injector (2) including a sampling mechanism (10) for sucking and dispensing a liquid, the injector (2) being configured to conduct a series of operations related to an injection of a sample into an analysis device; an operation condition setting part (16) configured to set operation conditions of the injector (2) in each of a plurality of processes included in the series of operations, based on a plurality of parameters which are set; and an information display device (6) configured to display information. In setting the operation conditions, the operation condition setting part (16) is configured to display an operation condition setting screen, in which an operation condition field for indicating the operation conditions for each of the processes reflecting the plurality of parameters which are set is included, on the information display device, and the operation condition setting part (16) is configured, when an operation to determine the plurality of parameters has performed by a user, to set the operation conditions based on the plurality of parameters which are currently set.

10 Claims, 3 Drawing Sheets

(56) References Cited

U.S. PATENT DOCUMENTS

| | | | |
|---|---|---|---|
| 2020/0110063 A1* | 4/2020 | Fukushima | G01N 30/06 |
| 2020/0200115 A1* | 6/2020 | Ahn | F02D 41/221 |
| 2020/0393425 A1* | 12/2020 | Fukushima | G01N 1/22 |
| 2020/0410311 A1* | 12/2020 | Koganehira | B41J 2/17506 |
| 2021/0270782 A1* | 9/2021 | Komori | G01N 35/10 |
| 2022/0187255 A1* | 6/2022 | Ohashi | G01N 30/32 |

* cited by examiner

AUTOMATIC SAMPLE INJECTION DEVICE

BACKGROUND OF THE INVENTION

1. Field of the Invention

The present invention relates to an automatic sample injection device for injecting a sample into an analysis device such as a gas chromatograph.

2. Description of the Related Art

Injection of a sample into an analysis device for conducting an analysis such as a gas chromatography analysis is commonly carried out by using an injector equipped with a sampling mechanism such as a syringe that sucks and discharges a liquid (see JP 2020-134194A). In the injection of the sample into the analysis device by the injector, a plurality of processes including washing the sampling mechanism with a solvent before injecting the sample into the analysis device, washing the sampling mechanism with the sample to be injected before injecting the sample into the analysis device, and injecting the sample to be injected into the analysis device are commonly conducted in accordance with a sequence that has been set beforehand.

The operation of the injector in each of the processes in the sequence as described above is controlled, based on lots of parameters that have been set beforehand by a user. Examples of the parameters that should be set by the user include the type of a solvent to be used for washing, the number of washing times using those solvents, and speeds of suction, discharge and injection of the solvent and the sample using the sampling mechanism.

How the injector is caused to operate in each of the processes in the sequence differs depending on the user's purpose and use application. In the automatic sample injection device so far, however, it is difficult for users to understand on which process in the sequence each of the parameters that have been set is reflected in the operation of the injector, and it cannot be said that it is easy to set an appropriate parameter according to a purpose or a use application.

SUMMARY OF THE INVENTION

The present invention has been made in view of the above drawbacks, and has an object to facilitate settings of parameters for operation control of an injector.

An automatic sample injection device according to the present invention includes: an injector including a sampling mechanism for sucking and dispensing a liquid, the injector being configured to conduct a series of operations related to an injection of a sample into an analysis device; an operation condition setting part configured to set operation conditions of the injector in each of a plurality of processes included in the series of operations, based on a plurality of parameters which are set; and an information display device configured to display information. Insetting the operation conditions, the operation condition setting part is configured to display an operation condition setting screen, in which an operation condition field for indicating the operation conditions for each of the processes reflecting the plurality of parameters which are set is included, on the information display device, and the operation condition setting part is configured, when an operation to determine the plurality of parameters has performed by a user, to set the operation conditions based on the plurality of parameters.

According to the automatic sample injection device according to the present invention, in setting the operation condition, the operation condition setting screen is displayed, and the operation condition field indicating the operation conditions for each of the processes that have reflected the plurality of parameters that have been set is displayed on the operation condition setting screen, in such a manner that user is able to set each parameter while confirming the operation conditions of the injector for each of the processes displayed in the operation condition field, and the parameter setting for operation control of the injector is facilitated.

DETAILED DESCRIPTION OF THE INVENTION

Hereinafter, an embodiment of an automatic sample injection device according to the present invention will be described with reference to the drawings.

Figure 1:
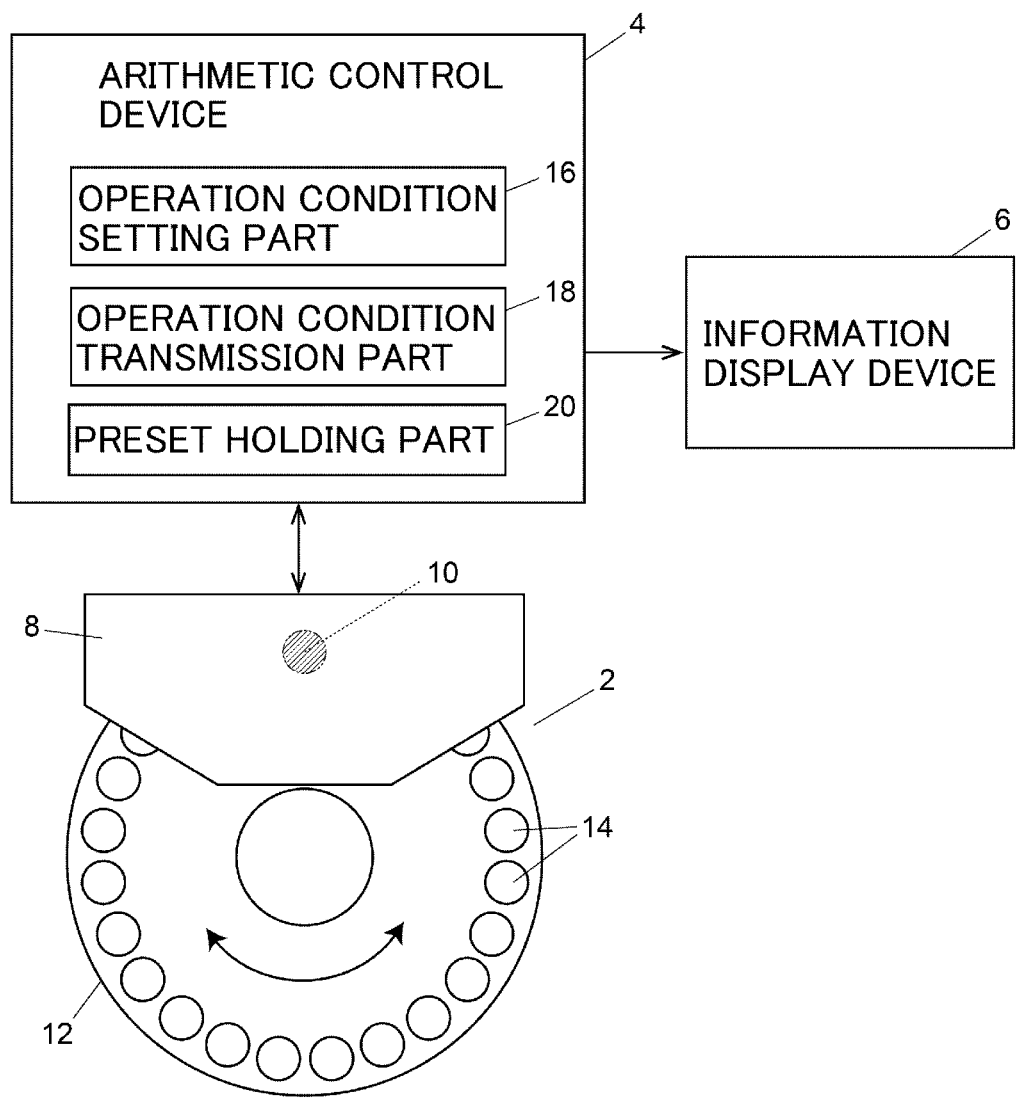
FIG. 1 is a schematic configuration diagram illustrating an embodiment of an automatic sample injection device.

As illustrated in FIG. 1, the automatic sample injection device includes an injector 2, an arithmetic control device 4, and an information display device 6. The injector 2 is disposed on a housing of an analysis device for conducting a gas chromatography analysis, and injects a sample into an injection port provided on an upper surface of the housing of the analysis device. The injector 2 performs a series of operations related to the injection of the sample into the analysis device, that is, an injection sequence, based on operation conditions which have been set by a user. The injection sequence is constituted by a plurality of processes, and the operation conditions of the injector 2 in each of the processes are set in the arithmetic control device 4.

The injector 2 includes an injector body 8 and a turret 12. The injector body 8 includes a syringe 10, which is a sampling mechanism that sucks and discharges a liquid. The injector body 8 is capable of vertically moving the syringe 10 with a tip end of the syringe 10 facing vertically downward. The turret 12 is a disk-shaped table, and includes a plurality of vial holders 14 on an upper surface. The plurality of vial holders 14 are arranged on an identical circumference. A vial that accommodates a solvent or a sample, a vial for storing a waste liquid, or the like is placed on each of the vial holders 14. The turret 12 rotates in a horizontal plane around the center of the circumference on which the vial holders 14 are arranged, and any vial placed on the vial holder 14 can be arranged immediately below the syringe 10 which is the sampling mechanism.

The arithmetic control device 4 is implemented by a general-purpose personal computer or a dedicated computer. An information display device 6 such as a liquid crystal display that displays various types of information is communicably connected with the arithmetic control device 4.

The arithmetic control device 4 is provided with an operation condition setting part 16, an operation condition transmission part 18, and a preset holding part 20. The operation condition setting part 16 and the operation condition transmission part 18 are functionalities obtained by the CPU in the arithmetic control device 4 executing a predetermined program, and the preset holding part 20 is a functionality implemented by a partial storage area of an information storage device (for example, a hard disk drive) in the arithmetic control device 4.

The operation condition setting part 16 is configured to set operation conditions of the injector 2 in a plurality of processes constituting the injection sequence, based on a plurality of parameters which are set. The parameter setting can be made by a user selecting a desired preset from a plurality of presets that have been prepared beforehand. In addition, the user is able to optionally edit a set value of each parameter based on the preset which has been selected.

The operation condition transmission part 18 is configured to transmit the operation conditions which have been set by the operation condition setting part 16 to the injector 2. The injector 2 receives the operation conditions which have been transmitted from the operation condition transmission part 18, and causes the syringe 10 and the turret 12 to operate, based on the operation conditions which have been received, so as to conduct an injection sequence of injecting a sample into the analysis device.

The preset holding part 20 holds a plurality of presets of each parameter for setting operation conditions, each preset being in association with accompanying information. In setting the operation conditions, the operation condition setting part 16 presents a list of presets held in the preset holding part 20 to the user, in such a manner that the user is able to use any preset from the list of presets that has been presented. The accompanying information of the preset is, for example, explanatory information such as an effect to be achieved by applying the preset (for example, a reduction of carry-over).

Figure 2:
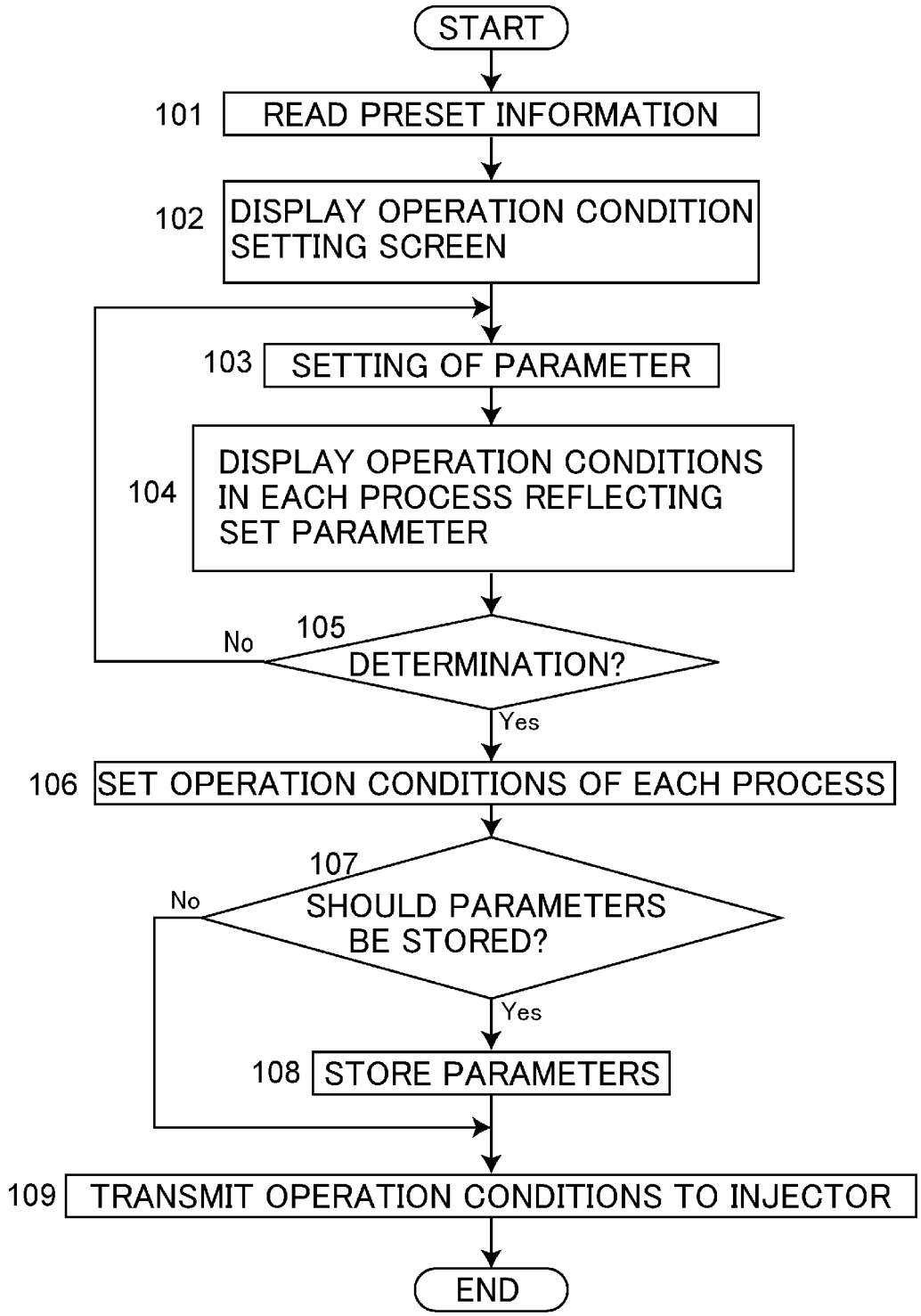
FIG. 2 is a flowchart illustrating an example of an operation related to settings of an operation condition of an injector in the embodiment.

An example of the operation related to the settings of the operation conditions of the injector 2 will be described by using an example of a flowchart of FIG. 2 and an operation condition setting screen of FIG. 3.

Figure 3:
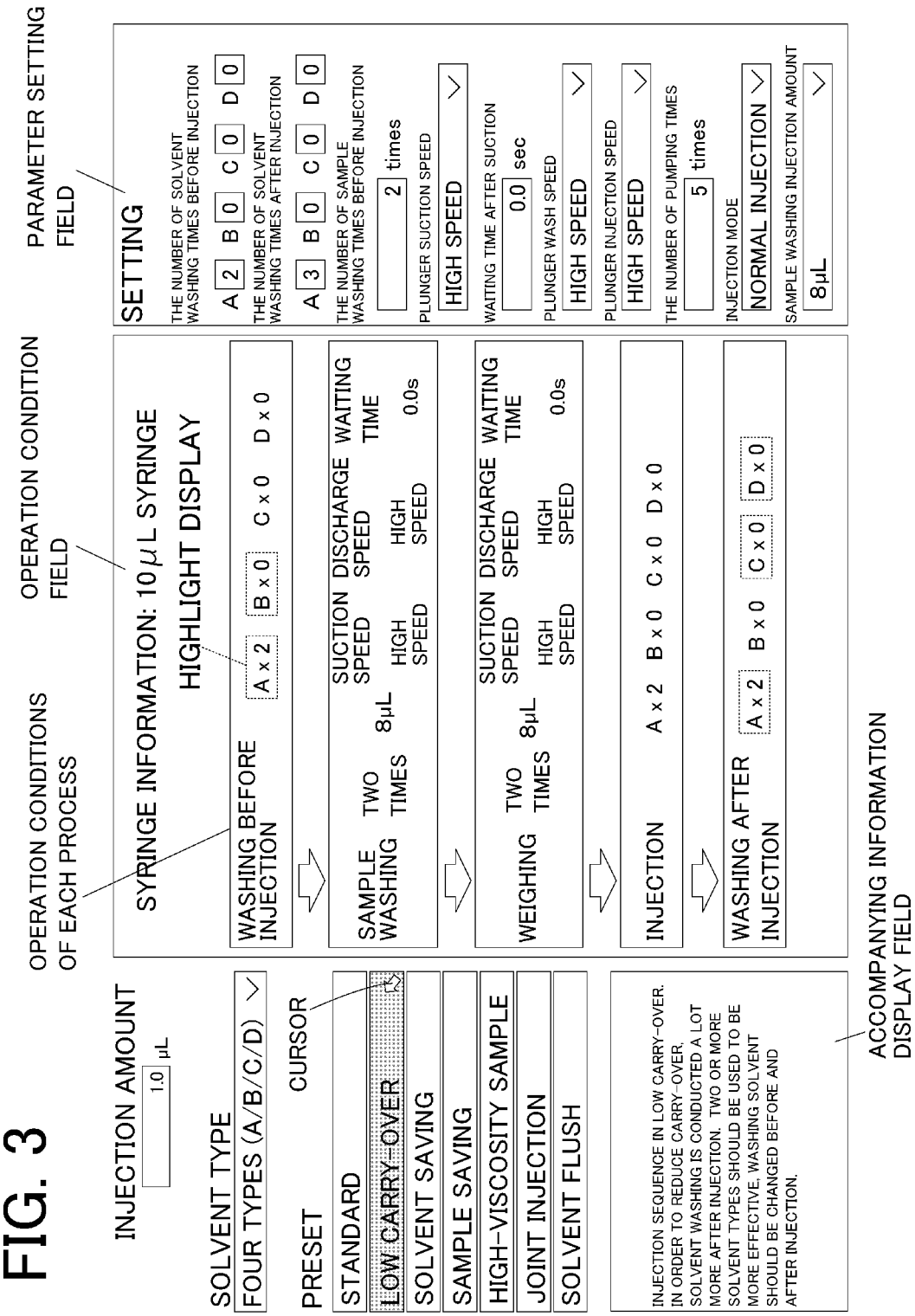
FIG. 3 is an example of an operation condition setting screen in the embodiment.

When a mode for setting the operation condition of the injector 2 is started, the operation condition setting part 16 reads information of the presets held in the preset holding part 20 (step 101), and displays the operation condition setting screen as illustrated in FIG. 3 on the information display device 6 (step 102).

The operation condition setting screen displayed on the information display device 6 includes a parameter setting field for a user to optionally set a plurality of parameters necessary for setting the operation condition of the injector 2, an operation condition field for displaying the operation conditions for every process reflecting parameters which have been set by selecting a preset to be described later or parameters that have been optionally set by the user in the parameter setting field in an order to be conducted in the injection sequence, a list of presets that have been read from the preset holding part 20, and an accompanying information display field for displaying the accompanying information of the preset when the preset is temporarily selected by the user. In the example of FIG. 3, the operation condition field is arranged at the center, the parameter setting field is arranged on the right side of the operation condition field, and an item for setting an injection amount of a sample, an item for setting the number of types of solvents, a list of presets, and the accompanying information display field are arranged on the left side of the operation condition field. Note that the parameter setting field may not be necessarily displayed. In addition, FIG. 3 illustrates an example in which the injection sequence is conducted in an order of a washing process of the syringe 10 with a solvent before a sample injection, a washing process of the syringe 10 with a sample before the sample injection, a weighing process of the sample with the syringe 10, an injecting process of the sample into the analysis device, and a washing process of the syringe 10 with the solvent after the sample injection.

In an initial state of the operation condition setting screen, the parameter setting field may not be necessarily displayed, and the parameter setting field may be displayed, as necessary. The user is able to select any preset from the list of presets displayed on the operation condition setting screen. When the user selects a desired preset, the operation condition setting part 16 applies a set value of each parameter of the preset to each parameter for setting the operation conditions (step 103), and displays the operation conditions of each process that has reflected those parameters, in the operation condition field (step 104). The set value of each parameter of the preset which has been selected by the user can be used for setting the operation conditions without change. In addition, the user is able to edit the set value of each parameter displayed in the operation condition field, while confirming the operation conditions of each process displayed in the operation condition field.

The set value of the parameter may be directly editable in the operation condition field. For example, when the user operates (for example, click of a mouse) for designating any operation condition among the operation conditions displayed in the operation condition field on the operation condition setting screen, the operation condition setting part 16 may shift to an edit mode of the operation condition field in which the user is able to directly input any value into the operation condition field.

Further, the set value of the parameter may be editable in the parameter setting field. When the user desires a parameter setting for every operation condition, a parameter setting field in which a parameter is displayed for every operation condition instead of for every process may be displayed, so that the user may be allowed to edit a set value of any parameter in the parameter display field. In addition, when the user operates (for example, click of a mouse) for designating any operation condition among the operation conditions displayed in the operation condition field on the operation condition setting screen, the operation condition setting part 16 may be configured to shift to an edit mode of the parameter that has been reflected on the designated operation condition by the user among the respective parameters in the parameter setting field. Accordingly, when there is an operation condition that the user desires to change, the user is able to easily recognize which parameter should be changed in order to change such an operation condition.

Further, the operation condition setting part 16 can also be configured to perform a highlight display, an animation display, or the like, so that the user can easily recognize the parameters that have been changed, when the parameters are changed by the preset being applied from the set value before the preset being applied. Once the user is able to easily recognize the parameters that have been changed by the preset being applied, the user is able to acquire knowledge about settings of the parameters, that is, how and which parameters should be changed in order to achieve an effect that the user desires (for example, a further reduction of carry-over).

Further, in the present embodiment, when the user operates for temporarily selecting any preset from the list of presets displayed on the operation condition setting screen, the operation condition setting part 16 is configured to indicate operation conditions or parameters which will be changed as a result of that the preset is actually selected, in the operation condition field and/or the parameter setting field. The operation condition setting part 16 is also configured to display accompanying information related to the preset in the accompanying information display field. The operation of temporarily selecting the preset may be, for example, an operation of placing a mouse cursor on any one of the presets displayed on the operation condition setting screen. Further, the operation of selecting the preset may be, for example, an operation of clicking any one of the presets displayed on the operation condition setting screen. In the example of FIG. 3, a preset having a name "low carry-over" is temporarily selected by a mouse cursor being placed on such a preset. In the operation condition field, the parameter to be changed when such a preset is selected is indicated by the highlight display.

In addition, the user is able to set preconditions on the operation condition setting screen. In the example of FIG. 3, the number of available types of solvent and a syringe capacity can be set as the preconditions. When the user sets a precondition, the operation condition setting part 16 displays items of parameters and available presets that can be set according to such a precondition, on the operation condition setting screen.

When the setting of each parameter is completed as described above, and the user operates for determining the parameters, for example, by clicking a "determination" button displayed on the operation condition setting screen (step 105: Yes), the operation condition setting part 16 sets the operation condition of the injector 2, based on the set value of each parameter (step 106). The set value of each parameter can be held as a new preset in the preset holding part 20. For example, when the user operates for determining a parameter, a display that asks the user whether the set value of each parameter is stored as a preset is displayed on the information display device 6 (step 107). In a case where the user desires to store the parameter, the set value of each parameter is stored in the preset holding part 20 (step 108). Then, the operation condition transmission part 18 transmits the operation conditions set by the operation condition setting part 16 to the injector 2 (step 109).

Note that the embodiment described heretofore has merely indicated an example of the automatic sample injection device according to an embodiment of the present invention. The automatic sample injection device according to an embodiment of the present invention will be described as follows.

An automatic sample injection device according to an embodiment of the present invention includes: an injector including a sampling mechanism for sucking and dispensing a liquid, the injector being configured to conduct a series of operations related to an injection of a sample into an analysis device; an operation condition setting part configured to set operation conditions of the injector in each of a plurality of processes included in the series of operations, based on a plurality of parameters which are set; and an information display device configured to display information, wherein in setting the operation conditions, the operation condition setting part is configured to display an operation condition setting screen, in which an operation condition field for indicating the operation conditions for each of the processes reflecting the plurality of parameters which are set is included, on the information display device, and the operation condition setting part is configured, when an operation to determine the plurality of parameters has performed by a user, to set the operation conditions based on the plurality of parameters which are currently set.

In a first aspect of the above-described embodiment, the operation condition setting part is configured to indicate the operation conditions for each of the processes in an order to be conducted in the series of operations, in the operation condition field on the operation condition setting screen. According to such an aspect, the user easily recognizes the sequence to be accomplished by the parameters which have been set.

In a second aspect of the above-described embodiment, when an operation to designate one of the operation conditions indicated in the operation condition field is performed by a user, the operation condition setting part is configured to indicate, to the user, parameters being reflected on the designated operation condition by the user. According to such an aspect, when there is an operation condition that the user desires to change, the user can easily recognize which parameters should be changed in order to change such an operation condition. This second aspect can be combined with the first aspect.

In a third aspect of the above-described embodiment, a preset holding part configured to hold a plurality of presets of the plurality of parameters is further included, wherein the plurality of presets having been set beforehand, the operation condition setting part is configured to display a list of the plurality of presets on the operation condition setting screen in such a manner that a user is able to select any one preset among the plurality of presets held by the preset holding part, and when one of the plurality of presets is selected by the user, the operation condition setting part is configured to set, as parameters used for setting the operation conditions, each parameter included in the selected preset by the user. Such an aspect further facilitates setting of the parameter. This third aspect can be combined with the first aspect and/or the second aspect.

In the above-described third aspect, when an operation to designate a parameter, which should be changed, among the parameters which have been set as the parameters used for setting the operation conditions is performed, the operation condition setting part may be configured to shift to an edit mode for editing a set value of the designated parameter. With such a configuration, the user is able to optionally edit each parameter that has been set by using the preset.

In the above-described third aspect, when one of the plurality of presets is temporarily selected by a user in a state where the plurality of parameters have been set, the operation condition setting part may be configured to indicate parameters which will be changed as a result of that the temporarily selected preset is selected actually, of the plurality of parameters which have been set, on the operation condition setting screen, and/or, the operation condition setting part is configured to indicate operation conditions, which will be changed as a result of that the temporarily selected preset will selected actually, of the operation conditions displayed in the operation condition field, on the operation condition setting screen. With such a configuration, the user is allowed to recognize how the operation conditions or the parameters are changed, when the temporarily selected preset is applied.

Further, in the above-described third aspect, the preset holding part holds the plurality of presets each being in association with accompanying information, and when one of the plurality of presets is temporarily selected by a user, the operation condition setting part may be configured to display the accompanying information in association with the temporarily selected preset, on the operation condition setting screen. With such a configuration, the user easily grasps what the temporarily selected preset is like.

Further, in the above-described third aspect, the preset holding part may be configured to additionally hold the plurality of parameters set by the user, as one of the presets. With such a configuration, each parameter that has been set by the user in the past is reusable for setting the operation conditions.

In a fourth aspect of the above-described embodiment, the plurality of processes include a process for washing the sampling mechanism before injecting of the sample into the analysis device.

In a fifth aspect of the above-described embodiment, the plurality of processes include a process for washing the sampling mechanism after injecting the sample into the analysis device.

REFERENCE SIGNS LIST

2: Injector
4: Arithmetic control device
6: Information display device
8: Injector body
10: Syringe
12: Turret
14: Vial holder
16: Operation condition setting part
18: Operation condition transmission part
20: Preset holding part

What is claimed is:

1. An automatic sample injection device comprising:
an injector including a sampling mechanism for sucking and dispensing a liquid, the injector being configured to conduct a series of operations related to an injection of a sample into an analysis device;
an operation condition setting part configured to set operation conditions of the injector in each of a plurality of processes included in the series of operations, based on a plurality of parameters which are set; and
an information display device configured to display information,
wherein in setting the operation conditions, the operation condition setting part is configured to display an operation condition setting screen, in which an operation condition field for indicating the operation conditions for each of the processes reflecting the plurality of parameters which are set is included, on the information display device, and the operation condition setting part is configured, when an operation to determine the plurality of parameters has performed by a user, to set the operation conditions based on the plurality of parameters which are currently set.

2. The automatic sample injection device according to claim 1, wherein the operation condition setting part is configured to indicate the operation conditions for every process in an order to be conducted in the series of operations, in the operation condition field on the operation condition setting screen.

3. The automatic sample injection device according to claim 1, wherein when an operation to designate one of the operation conditions indicated in the operation condition field is performed by a user, the operation condition setting part is configured to indicate, to the user, parameters being reflected on the designated operation condition by the user.

4. The automatic sample injection device according to claim 1, further comprising a preset holding part configured to hold a plurality of presets of the plurality of parameters, the plurality of presets having been set beforehand,
wherein the operation condition setting part is configured to display a list of the plurality of presets on the operation condition setting screen in such a manner that a user is able to select any one preset among the plurality of presets held by the preset holding part, and when one of the plurality of presets is selected by the user, the operation condition setting part is configured to set, as parameters used for setting the operation conditions, each parameter included in the selected preset by the user.

5. The automatic sample injection device according to claim 4, wherein when an operation to designate a parameter, which should be changed, among the parameters which have been set as the parameters used for setting the operation conditions is performed, the operation condition setting part is configured to shift to an edit mode for editing a set value of the designated parameter.

6. The automatic sample injection device according to claim 4, wherein when one of the plurality of presets is temporarily selected by a user in a state where the plurality of parameters have been set, the operation condition setting part is configured to indicate parameters, which will be changed as a result of that the temporarily selected preset will selected actually, of the plurality of parameters which have been set, on the operation condition setting screen, and/or, the operation condition setting part is configured to indicate operation conditions, which will be changed as a result of that the temporarily selected preset will selected actually, of the operation conditions displayed in the operation condition field, on the operation condition setting screen.

7. The automatic sample injection device according to claim 4, wherein
the preset holding part holds the plurality of presets each being in association with accompanying information, and
when one of the plurality of presets is temporarily selected by a user, the operation condition setting part is configured to display the accompanying information in association with the temporarily selected preset, on the operation condition setting screen.

8. The automatic sample injection device according to claim 4, wherein the preset holding part is configured to additionally hold the plurality of parameters set by the user, as one of the presets.

9. The automatic sample injection device according to claim 1, wherein the plurality of processes include a process for washing the sampling mechanism before injecting of the sample into the analysis device.

10. The automatic sample injection device according to claim 1, wherein the plurality of processes include a process for washing the sampling mechanism after injecting the sample into the analysis device.

* * * * *